(12) United States Patent
Wilcock et al.

(10) Patent No.: US 11,281,543 B2
(45) Date of Patent: Mar. 22, 2022

(54) APPLICATION-LEVEL RECOVERY FROM AN ENTERPRISE-LEVEL IMAGE COPY

(71) Applicant: International Business Machines Corporation, Armonk, NY (US)

(72) Inventors: Glenn Randle Wilcock, Tucson, AZ (US); Shannon Lyn Gallaher, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 16/684,911

(22) Filed: Nov. 15, 2019

(65) Prior Publication Data

US 2021/0149771 A1 May 20, 2021

(51) Int. Cl.
*G06F 11/14* (2006.01)

(52) U.S. Cl.
CPC ...... *G06F 11/1464* (2013.01); *G06F 11/1451* (2013.01); *G06F 11/1456* (2013.01); *G06F 11/1469* (2013.01)

(58) Field of Classification Search
CPC .............. G06F 11/1464; G06F 11/1469; G06F 11/1456; G06F 11/1451
See application file for complete search history.

(56) References Cited

U.S. PATENT DOCUMENTS

| | | | |
|---|---|---|---|
| 8,140,475 B1* | 3/2012 | Sparks | G06F 11/1417 707/634 |
| 8,402,309 B2 | 3/2013 | Timashev | |
| 9,594,643 B2* | 3/2017 | Dinkar | G06F 11/1451 |
| 10,095,560 B2 | 10/2018 | Margalit | |
| 10,252,159 B2 | 4/2019 | Quan | |
| 2007/0043973 A1* | 2/2007 | Schneider | G06F 11/1451 714/15 |
| 2015/0248336 A1* | 9/2015 | Han | G06F 11/1469 711/162 |
| 2018/0081766 A1* | 3/2018 | Ghuge | G06F 11/2048 |
| 2018/0285215 A1 | 10/2018 | Ashraf | |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

* cited by examiner

*Primary Examiner* — Masud K Khan
*Assistant Examiner* — Trung-Hao Joseph Nguyen
(74) *Attorney, Agent, or Firm* — Richard B. Thomas

(57) ABSTRACT

Embodiments relate to a system, program product, and method for dynamically capturing environmental configuration changes related to applications such that application-level recoveries may be performed from enterprise-level image copy backups.

20 Claims, 11 Drawing Sheets

APPLICATION-LEVEL RECOVERY FROM AN ENTERPRISE-LEVEL IMAGE COPY

BACKGROUND

The present disclosure relates to execution of application-level recoveries from an enterprise-level image copy, and, more specifically, for dynamically capturing environmental configuration changes related to applications such that application-level recoveries may be performed from enterprise-level image copy backups.

Large-scale, e.g., enterprise-level, storage media backups are performed with a predetermined frequency to provide temporally-specific image copy backups of the data and metadata stored on the array of storage media. These enterprise-level storage backups of the entire inventory of data and metadata are typically created quickly, and in at least some instances, in less than one second. The backup image copies are defined at the granularity of the storage media being imaged and allow for an enterprise-wide recovery from catastrophic events, e.g., natural disasters and ransomware attacks.

SUMMARY

A system, computer program product, and method are provided for facilitating dynamically capturing environmental configuration changes related to applications such that application-level recoveries may be performed from enterprise-level image copy backups.

In one aspect, a computer system is provided to perform application-level recoveries from enterprise-level image copy backups. The system includes a processing device and a plurality of storage devices operably coupled in communication with the processing device. The system also includes a recovery manager operably coupled in communication with the processing device. The recovery manager creates a first physical storage configuration record of the computer system. The computer system further includes a copy manager communicatively coupled with the recovery manager. The copy manager is configured to create an image copy of the computer system. The image copy of the computer system and the first physical storage configuration record are independent of each other. The recovery manager further determines a recovery point for a portion of the computer system, and recover the portion of the computer system subject to the first physical storage configuration record and the image copy of the computer system.

In another aspect, a computer program product is provided to perform application-level recoveries from enterprise-level image copy backups. The computer program product includes one or more computer readable storage media with program instructions collectively stored thereon. Program instructions are provided to create a physical storage configuration record of an enterprise computer system. Additional program instructions are provided to create an image copy of the enterprise computer system. The image copy of the enterprise computer system and the physical storage configuration record are independent of each other. Program instructions are provided to determine a recovery point for a portion of the enterprise computer system, and recover the portion of the enterprise computer system subject to the physical storage configuration record and the image copy of the enterprise computer system.

In yet another aspect, a computer-implemented method to perform application-level recoveries from enterprise-level image copy backups is provided. The method includes creating a physical storage configuration record of an enterprise computer system and creating an image copy of the enterprise computer system. The image copy of the enterprise computer system and the physical storage configuration record are independent of each other. The method also includes determining a recovery point for a portion of the enterprise computer system. The method further includes recovering the portion of the enterprise computer system subject to the physical storage configuration record and the image copy of the enterprise computer system.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
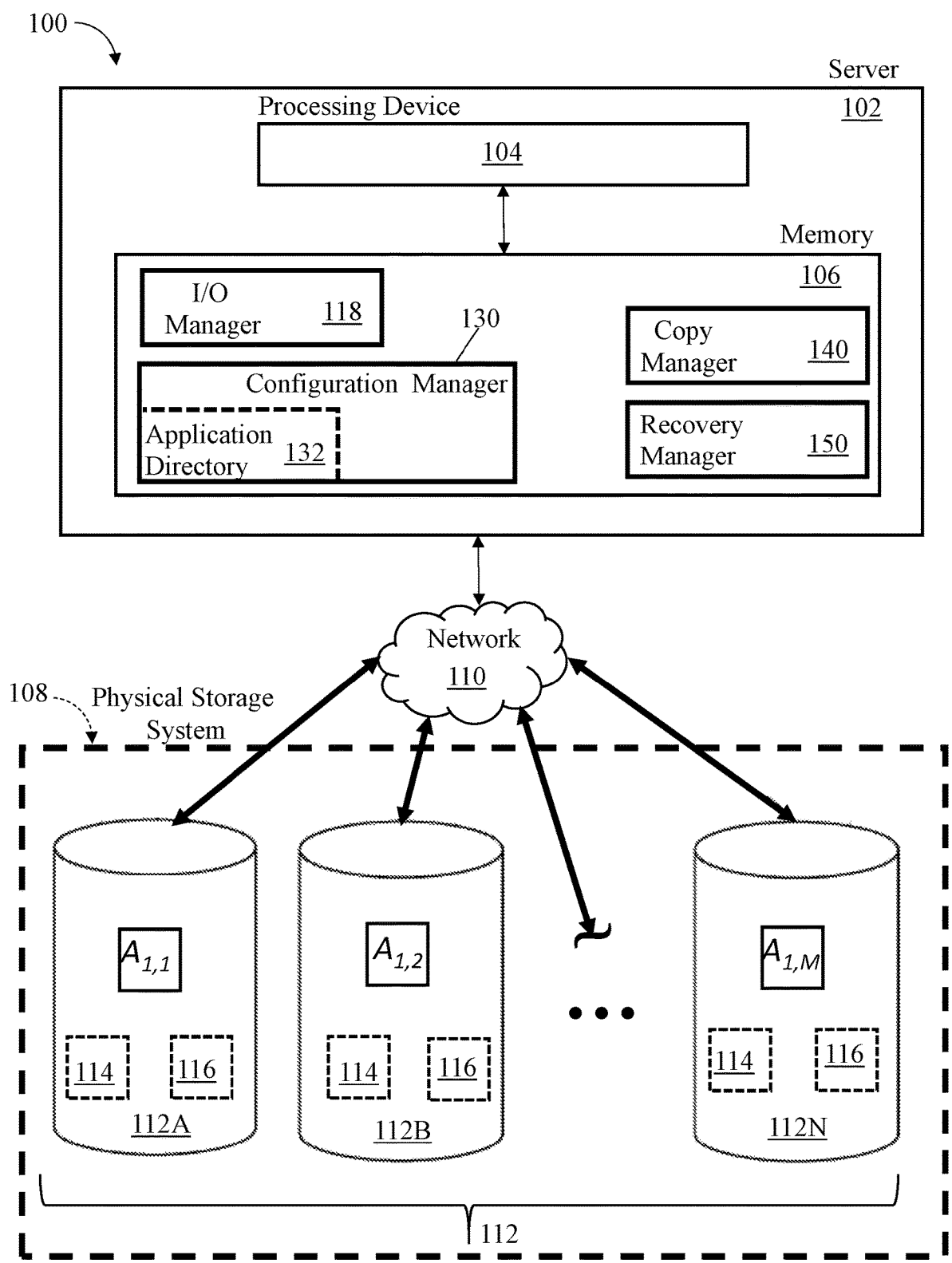
FIG. 1 is a schematic diagram illustrating a computing environment suitable for dynamically capturing environmental configuration changes related to applications such that application-level recoveries may be performed from enterprise-level image copy backups.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Large-scale enterprise computer systems include extensive persistent storage resources that are routinely backed-up to perform a recovery of the data and metadata stored thereon from a catastrophic event, e.g., a natural disaster such as a hurricane, or man-made events such as a ransomware attack. Therefore, large-scale, e.g., enterprise-level, storage media backups are performed with a predetermined frequency to provide temporally-specific image copy backups of the data and metadata stored on the array of storage media. These enterprise-level storage backups of the entire inventory of data and metadata are typically created quickly, and in at least some instances, in less than one second. The backup image copies are then used to perform an enterprise-wide recovery. The backup image copies are defined at the granularity of the storage media that was available, or coupled to, the remainder of the enterprise computer system at the time of the backup. Defining the backup at this high-level granularity facilitates the relatively quick creating of the image copy because the use of any finer granularity would use additional resources and take longer. Accordingly, any recovery is restricted to recovering the entire enterprise as a function of the entire suite of storage devices at the time of the creation of the image copy.

In order to accommodate the storage media granularity associated with the enterprise-level image copy, all the data and metadata the represents the application must also be defined with respect to the storage media that it resides on at the time of the image copy creation. In addition, all new allocations and extensions for the associated application must be within that defined set of storage media and this media may not contain data or metadata from any other application. Accordingly, the storage media granularity defines these application-based dedicated storage restrictions because the recovery is at that storage media level and any interspersed data and metadata would cause the recovery of one application to regress the data and metadata of any other application stored on the same media.

While the storage media granularity provides for the relatively rapid creating of the enterprise-wide image copy, over the lifecycle of an application, the application's associated data and metadata expand and contract across a set of storage media. When an image copy of an enterprise is created, each application resides on a specific set of media. This media set may change as each image copy is created due to the aforementioned expansion and contraction of the data throughout the storage media suite. Therefore, to perform a successful recovery of all of the data and metadata for an application, the specific set of media on which the application resided at the time of the creation of the image copy must be known. One technique to capture this storage suite information includes serializing the storage environment of each application before creating the image copy and capturing the application's storage environment. However, across hundreds, or even thousands, of applications resident on an enterprise computer system, the serialization process would be time consuming and would likely exceed the limited time given to create the large-scale image copies. Accordingly, the time- and resource-efficient method of generating recovery-ready backup image copies will likely continue to be utilized for enterprise-wide backups.

A system, method, and computer program product are disclosed and described herein for using dynamically capturing environmental configuration changes related to applications such that application-level recoveries may be performed from enterprise-level image copy backups. In at least one embodiment, a process dynamically captures the application-level storage media environment whenever there is a change to the storage media configuration. Specifically, a system including a recovery manager, a method, and a product, as described herein, creates a base line set of storage configuration records for each application in the enterprise computer system. These configuration records include storage metadata for each application which defines the storage media associated with each application. Whenever there is a configuration change, e.g., an application is added to, or removed from, the enterprise computer system, or storage media is added to or removed from the system, a configuration manager issues a configuration change notification. Upon receipt of this notification, the storage configuration is temporarily locked by the configuration manager while a new set of storage configuration records are generated to capture the new configuration. After the configuration records are created, the storage configuration is unlocked by the recovery manager. The timestamp associated with the configuration change is also recorded.

In parallel to the creation of these storage configuration records, large-scale image copies are periodically created, by a copy manager, for the entire enterprise computer system, regardless of any configuration changes. Given one or more user-identified applications to recover and a user-specified recovery point, the creation times of the inventory of image copies are examined to find the image copy with a timestamp that represents the closest backup time prior to the desired recovery point. The timestamps of the storage configuration records are then examined to find the records that represent the configuration at the time of the backup by finding the closest storage records associated with the identified applications created before the desired recovery point. The configuration records from this prior time are used to determine which storage media were related to the application at the time of generation of the selected image copy backup. Then, the existing configuration records of the present time are reconciled with the backup configuration records to determine (1) which, if any, storage media were added to the application since the backup was made and (2) which, if any, storage media were removed from the application since the backup copy was made. Storage media that were added will not be included in the recovery and will be initialized to return them to the state that they existed at the time of the backup. Storage media that were removed from the application configuration will be returned to the application configuration because they are required for the application to complete successfully. Once the configuration has been returned to the state as it existed at the time of the backup, the image recovery of all of the associated media is initiated. Once the recovery completes, any forward recovery can additionally be started. Accordingly, the dynamic capturing of environmental configuration changes related to applications such that application-level recoveries may be performed from enterprise-level image copy backups results in a practical application of an improvement to the functioning of the associated computer systems, and specifically, the data recovery features of the computer systems.

Referring to FIG. 1, a schematic diagram is provided illustrating a computing environment, i.e., an enterprise computer system 100 suitable for dynamically capturing environmental configuration changes related to applications such that application-level recoveries may be performed from enterprise-level image copy backups. The enterprise computer system 100 includes at least one server 102 (only one shown) that includes a processing device 104 operably coupled to a memory 106. The enterprise computer system 100 also includes a physical storage system 108 coupled to the server 102 through a network 110. The physical storage system 108, referred to hereinafter as the storage system 108, in at least one embodiment, includes storage media, i.e., a plurality of storage devices 112, e.g., a first storage device 112A, a second storage device 112B, through an $N^{th}$ storage device 112N. Only three storage devices 112 are shown in FIG. 1, however, in other embodiments, the storage system 108 may include any number of storage devices 112 that enable operation of the enterprise computer system 100 as described herein. The storage system 108 may be implemented as, without limitation, in one or more storage devices 112, or an array of storage devices 112 configured as Just a Bunch of Disks (JBOD), Direct Access Storage Device (DASD), Redundant Array of Independent Disks (RAID) array, virtualization device, tape storage, flash memory, portable and stationary hard disk drives (HDDs), solid state storage device (SSD) comprised of solid state electronics, and optical disks. The network 110 may include, without limitation, a Storage Area Network (SAN), Local Area Network (LAN), Intranet, the Internet, Wide Area Network (WAN), peer-to-peer network, wireless network, and arbitrated loop network. Accordingly, the enterprise computer system 100 includes a storage system 108 coupled to a server 102 through a network 110.

The storage system 108 stores application data and metadata for every application resident on the enterprise computer system 100. In at least one embodiment, for one application, e.g., for a first application $A_1$, a first portion of the data and metadata of $A_1$ ($A_{1,1}$) is resident on the first storage device 112A, a second portion of the data and metadata of the first application $A_1$ ($A_{1,2}$) is resident on the second storage device 112B, and an $M^{th}$ portion of the data and metadata of the first application $A_1$ ($A_{1,M}$) is resident on the $N^{th}$ storage device 112N, where a value of M may, or may not, be equal to a value of N. Accordingly, the storage devices 112A, 112B, and 112N house only the data and metadata associated with a single application, i.e., the first application $A_1$, and therefore house no data associated with any other applications. Similarly, the storage devices between the second storage device 112B and the $N^{th}$ storage device 112N each house the data and metadata associated with a single application. Examples of enterprise-wide applications include, without limitation, payroll, warehouse, transportation, and batch jobs. Accordingly, the storage devices 112A through 112N include either full sets of application data and metadata for applications resident on a single storage device 112 or a portion of the data and metadata for applications spread across some combination of exclusive storage devices 112A through 112N.

In addition, at least one of the storage devices 112 store image copies 114 of the enterprise computer system 100 and physical storage configuration records 116. The image copies 114 and physical storage configuration records 116 are shown in phantom on the three illustrated storage devices 112A, 112B, and 112N to indicate that they will not reside on a storage device with application data thereon to preserve the application-only feature of the storage devices 112. The image copies 114 and physical storage configuration records 116 are described further herein.

The server 102 also includes a plurality of modules. Specifically, the server 102 includes an Input/Output ("I/O") manager 118 to manage read and write requests directed to the storage system 108. The server 102 further includes a configuration manager 130 to manage the physical storage system 108, i.e., to manage the boundaries of the data stored on the storage system 108 on an application-by-application basis. The configuration manager 130 includes an application directory 132 having a record for each application data and metadata set resident within the storage system 108. Accordingly, the configuration manager 130 controls the configuration of the storage system 108.

The server also includes a copy manager 140 to create the image level copies 114, such as point-in-time copies, of the application data and metadata in the storage system 108. These large-scale, enterprise image copies 114 are periodically created, by the copy manager 140, for the entire enterprise computer system 100, regardless of any configuration changes. Given one or more user-identified applications to recover and a user-specified recovery point, the creation times of the inventory of image copies 114 are examined by a recovery manager 150 to locate the image copy with a timestamp that represents the closest backup time prior to the desired recovery point. The recovery manager 150 is discussed further herein. Accordingly, the copy manager 140 creates the image level copies 114 of the storage system 108 independently of changes to the configurations of the storage system 108.

In addition, the server 102 includes the recovery manager 150. The recovery manager 150 dynamically captures environmental configuration changes that are managed by the configuration manager 130, where the environmental configuration changes are related to applications such that application-level recoveries may be performed from enterprise-level image copy backups. For example, by querying the configuration manager 130, the recovery manager 150 creates a base line set of storage configuration records 116 for each application in the enterprise computer system 100. These configuration records 116 include storage metadata for each application which defines the storage media, i.e., the storage devices 112 associated with each application. Accordingly, the recovery manager 150 creates and manages the population of the storage configuration records 116.

Whenever there is a configuration change, e.g., an application is added to, or removed from, the enterprise computer system 100, or storage media is added to or removed from the enterprise computer system 100, the configuration manager 140 issues a configuration change notification that is received by the recovery manager 150. Upon receipt of this notification, the storage configuration is temporarily locked by the recovery manager 150 while a new set of storage configuration records are generated by the recovery manager 150 to capture the new configuration. While the storage configuration of the storage system 108 is locked, no changes are permitted for the application storage configurations. In at least one embodiment, the time period for the locking of the storage configurations extends from approximately one second to approximately 60 seconds. In many embodiments, this locking has no impact to application activity since such changes to the configuration are infrequent, e.g., the time period between changes to the storage configuration is typically measured in months.

After the configuration records are created, the storage configuration is unlocked by the recovery manager 140. The timestamp associated with the configuration change is also recorded by the recovery manager 150 and the recovery manager 150 stores the configuration record and the associated timestamp in the storage system 108. Accordingly, the configuration manager 130 controls the configuration of the storage system 108 and the recovery manager 150 manages the population of the storage configuration records 116.

When an application recovery is initiated, the recovery manager 150 finds the image copy with a timestamp that represents the closest backup time prior to the desired recovery point, the timestamps of the storage configuration records 116 are then examined by the recovery manager 150 to find the records 116 that represent the configuration at the time of the backup by finding the closest storage records 116 associated with the identified applications created before the desired recovery point. The configuration records 116 from this prior time are used by the recovery manager 150 to determine which storage devices 112 were related to the application at the time of generation of the selected image copy backup. Then, the existing configuration records of the present time are reconciled by the recovery manager 150 with the backup configuration records to determine (1) which, if any, storage devices 112 were added to the application since the backup was made and (2) which, if any, storage devices 112 were removed from the application since the backup copy was made. Storage devices 112 that were added will not be included in the recovery and will be initialized by the recovery manager 150 to return the storage devices 112 to the state that they existed at the time of the backup. Storage devices 112 that were removed from the application configuration will be returned to the application configuration by the recovery manager 150 because they are required for the application to complete successfully. Once the configuration has been returned to the state as it existed at the time of the backup by the recovery manager 150, the image recovery of all of the associated storage media is initiated and conducted by the recovery manager 150. Once the recovery completes, any forward recovery can additionally be started. Accordingly, the combined use of the configurations of the storage devices 112 for each application and the enterprise-wide image copies that are independently created are used to perform recoveries of the selected applications without requiring a recovery of the entire enterprise computer system.

Figure 2:
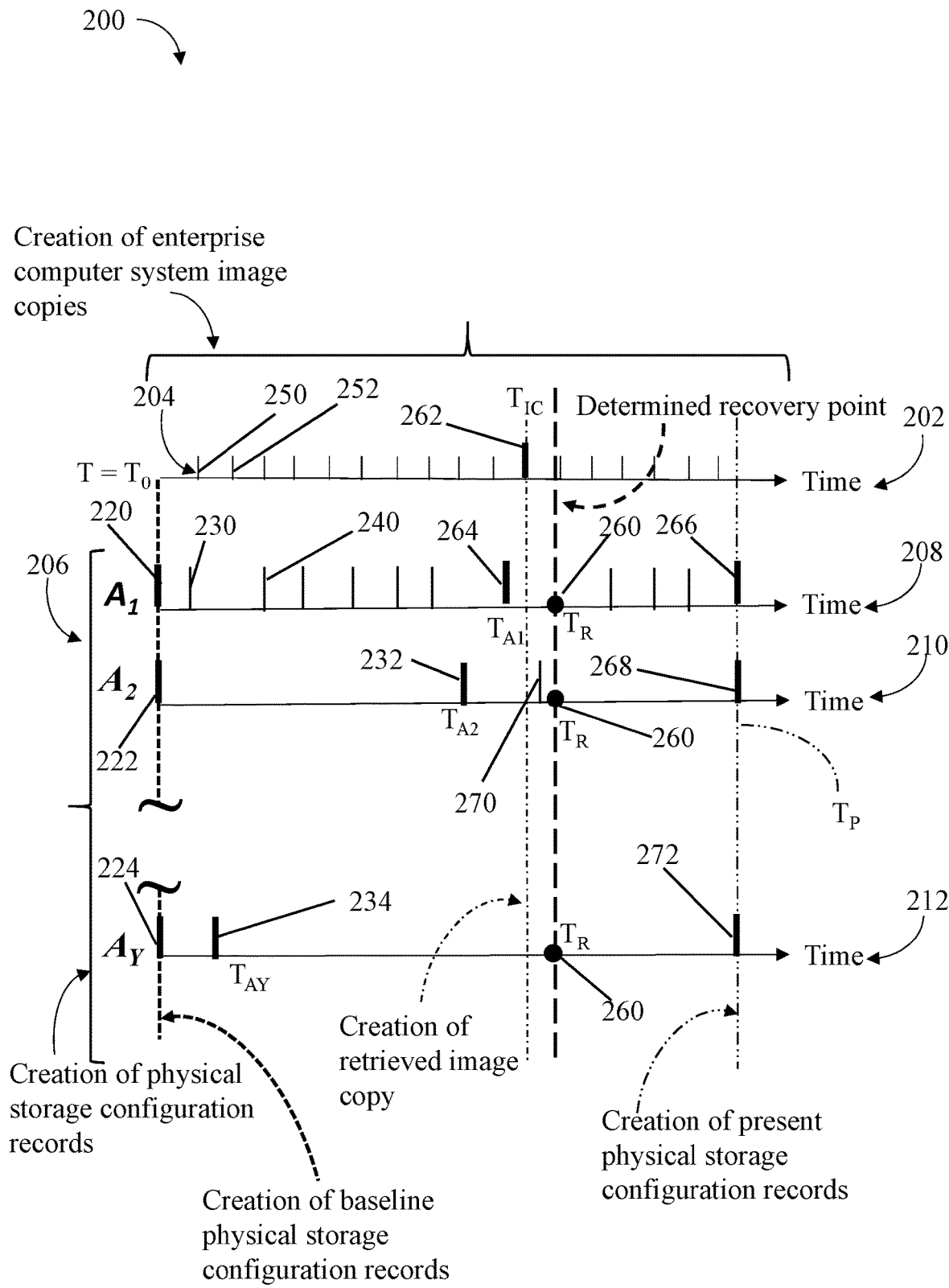
FIG. 2 is a schematic diagram illustrating an example of temporally-based creations of enterprise-level image copies and physical storage configuration records, in accordance with some embodiments of the present disclosure.

FIG. 2 depicts a schematic diagram 200 illustrating an example of temporally-based creations of enterprise-level image copies of the enterprise computer system 100 and the physical storage configuration records associated with the plurality of storage devices 112 in the physical storage system 108, in accordance with some embodiments of the present disclosure. The diagram 200 includes a first timeline 202 associated with the creation of the enterprise-wide image copies 114 of the data and metadata of the enterprise computer system 100. The timeline has an origin at time $T=T_0$ associated with initialization of the enterprise computer system 100 and generation of the baseline physical storage configuration records 116 for each of the applications resident on the enterprise computer system 100. The first timeline 202 includes a plurality of tick marks 204 that are discussed further herein.

The diagram 200 also includes a plurality of timelines 206 associated with the creation of the physical storage configuration records 116. The plurality of timelines 206 are temporally aligned with the first timeline 202, i.e., the origin of each of the plurality of timelines 206 is at time $T=T_0$. The plurality of timelines 206 includes a second timeline 208, a third timeline 210, and a fourth timeline 212. The second timeline 208 is associated with the first application $A_1$, the third timeline 210 is associated with a second application $A_2$, and the fourth timeline 212 is associated with a $Y^{th}$ application $A_Y$. The second, third, and fourth timelines 208, 210, and 212 each include a one or more tick marks that are discussed further herein. The diagram 200 is discussed further in relation to FIGS. 3-5 herein. Accordingly, the diagram 200 illustrates the temporal and operational relationships between the enterprise-wide image copies 114 of the data and metadata of the enterprise computer system 100 and the physical storage configuration records 116, where the enterprise-wide image copies 114 and the physical storage configuration records 116 are created independently.

Figure 3:
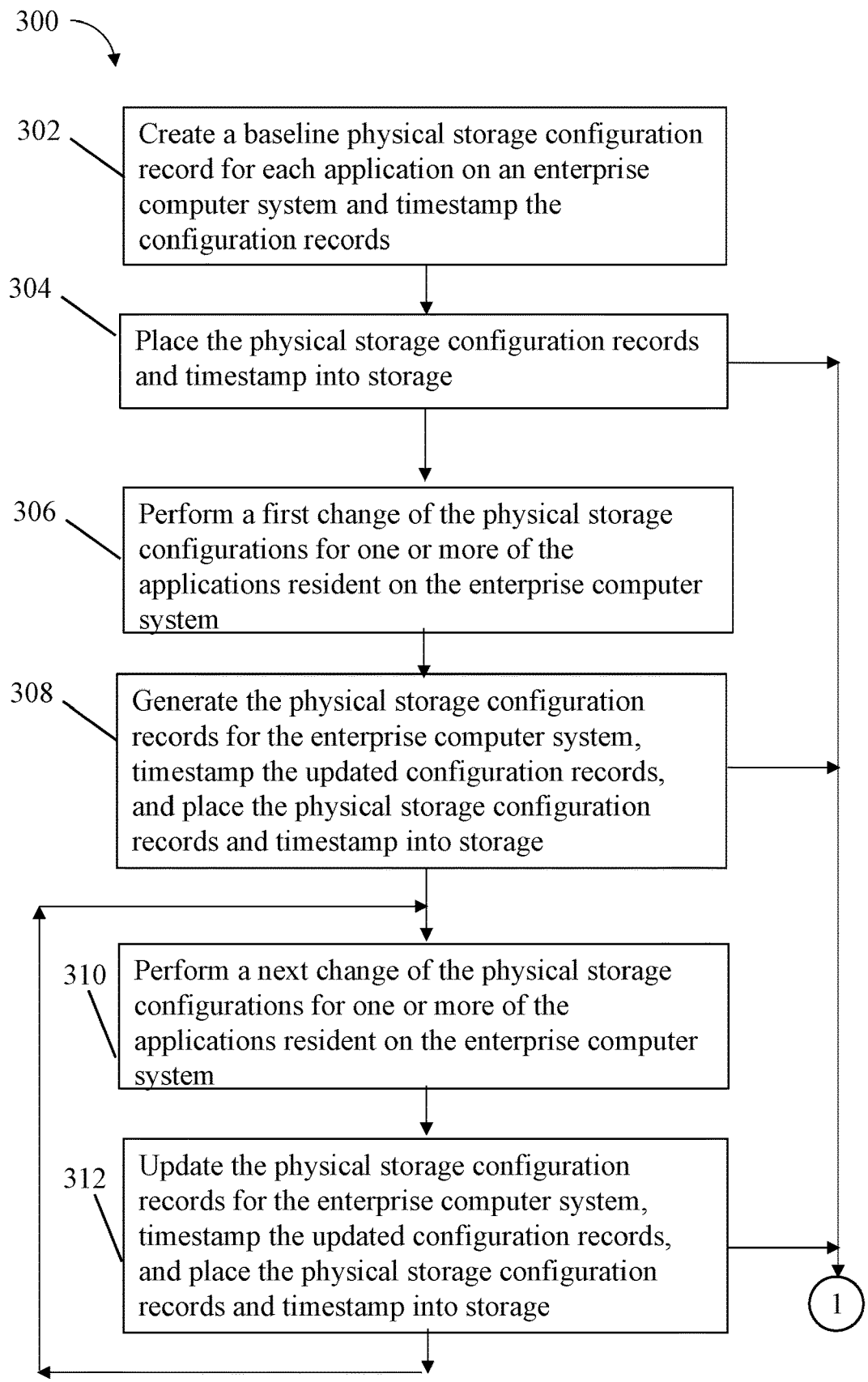
FIG. 3 is a flow chart illustrating a process for creating physical storage configuration records, in accordance with some embodiments of the present disclosure.

FIG. 3 depicts a flow chart illustrating a process 300 for creating physical storage configuration records 116. Referring to FIGS. 2 and 3, a baseline physical storage configuration record 220, 222, and 224 for each of the first application $A_1$, the second application $A_2$, and the $Y^{th}$ application $A_Y$, respectively, that are resident on the enterprise computer system 100, is created 302 by the recovery manager 150. The configuration of the storage system 108 with respect to the first application $A_1$, the second application $A_2$, and the $Y^{th}$ application $A_Y$, is created and managed by the configuration manager 130. Therefore, to create 302 the baseline physical storage configuration record 220, 222, and 224, the recovery manager 150 queries the configuration manager 130 for the baseline configuration information resident within the application directory 132. In addition, the timestamps associated with the creation operation 302 of the baseline configuration records 220, 222, and 224 are recorded by the recovery manager 150 through the query of the configuration manager 130. Accordingly, the recovery manager 150 queries the configuration manager 130 to capture physical storage configuration records of the storage system 108.

The timestamps for the baseline physical storage configuration records 220, 222, and 224 are placed at time $T=T_0$. The baseline configuration records 220, 222, and 224 include the metadata that defines the configuration of the plurality of storage devices 112 in the physical storage system 108 on which the data and metadata of the first application $A_1$, the second application $A_2$, and the $Y^{th}$ application $A_Y$, respectively, reside. For example, in at least one embodiment, and as shown in FIG. 1, the data and metadata of the first application $A_1$ resides on the first storage device 112A, the second storage device 112B, and the $N^{th}$ storage device 112N. As discussed further herein, over the lifecycle of the applications $A_1, A_2$, through $A_Y$, the application's associated data and metadata expand and contract across the plurality of storage devices 112. The physical storage configuration records 116 and the associated timestamps are placed 304 into storage as shown in FIG. 1 by the recovery manager 150. In at least one embodiment, a similar generation of a baseline storage media configuration of the storage devices 112 is executed for applications newly installed on the enterprise computer system 100 after the initial baseline is generated. Accordingly, each application $A_Y$ on the enterprise computer system 100 has a generated baseline storage media configuration of storage devices 112 exclusively associated with that particular application.

A first change in the physical storage configurations for one or more of the applications $A_1$, $A_2$, through $A_Y$, is performed 306 on the enterprise computer system 100 by the configuration manager 130. The information associated with the first physical storage reconfiguration is maintained in the application directory 132. The physical storage reconfigurations may include, without limitation, addition and/or removal of data on a particular set of storage media and addition and/or removal of storage media, for example, and without limitation, replacement of tape devices with solid state or magnetic devices. In at least one embodiment, subsequent to performing the operation 306, first physical storage configuration records 230, 232, and 234 for the applications $A_1$, $A_2$, and $A_Y$ on the enterprise computer system 100 and the timestamps for the updated configuration records 230, 232, and 234 are generated 308, or updated, through a query by the recovery manager 150 to the configuration manager 130. In addition, the physical storage configuration records 230, 232, and 234, and associated timestamps are placed into storage by the recovery manager 150 as shown in FIG. 1.

A next change in the physical storage configurations for one or more of the applications $A_1$, $A_2$, through $A_Y$, is performed 310 on the enterprise computer system 100 by the configuration manager 130. The information associated with the next physical storage reconfiguration is maintained in the application directory 132. No physical storage reconfigurations for the applications $A_2$ and $A_Y$ are made. Subsequent to performing the operation 310, the physical storage configuration record 240 for the application $A_1$ on the enterprise computer system 100 and the timestamp for the updated configuration record 240 are generated 312, or updated, through a query by the recovery manager 150 to the configuration manager 130. The physical storage configuration record 240 and associated timestamps are placed into storage by the recovery manager 150 as shown in FIG. 1. The portion of the process 300 that includes the operations 310 and 312 are iteratively repeated whenever a storage configuration associated with any of the applications resident on the enterprise computer system 100 is performed. Accordingly, the storage configurations associated with the applications $A_1$ through $A_Y$ on the enterprise computer system 100 are monitored and changes thereto are recorded and the records are timestamped for use as described further herein.

Figure 4:
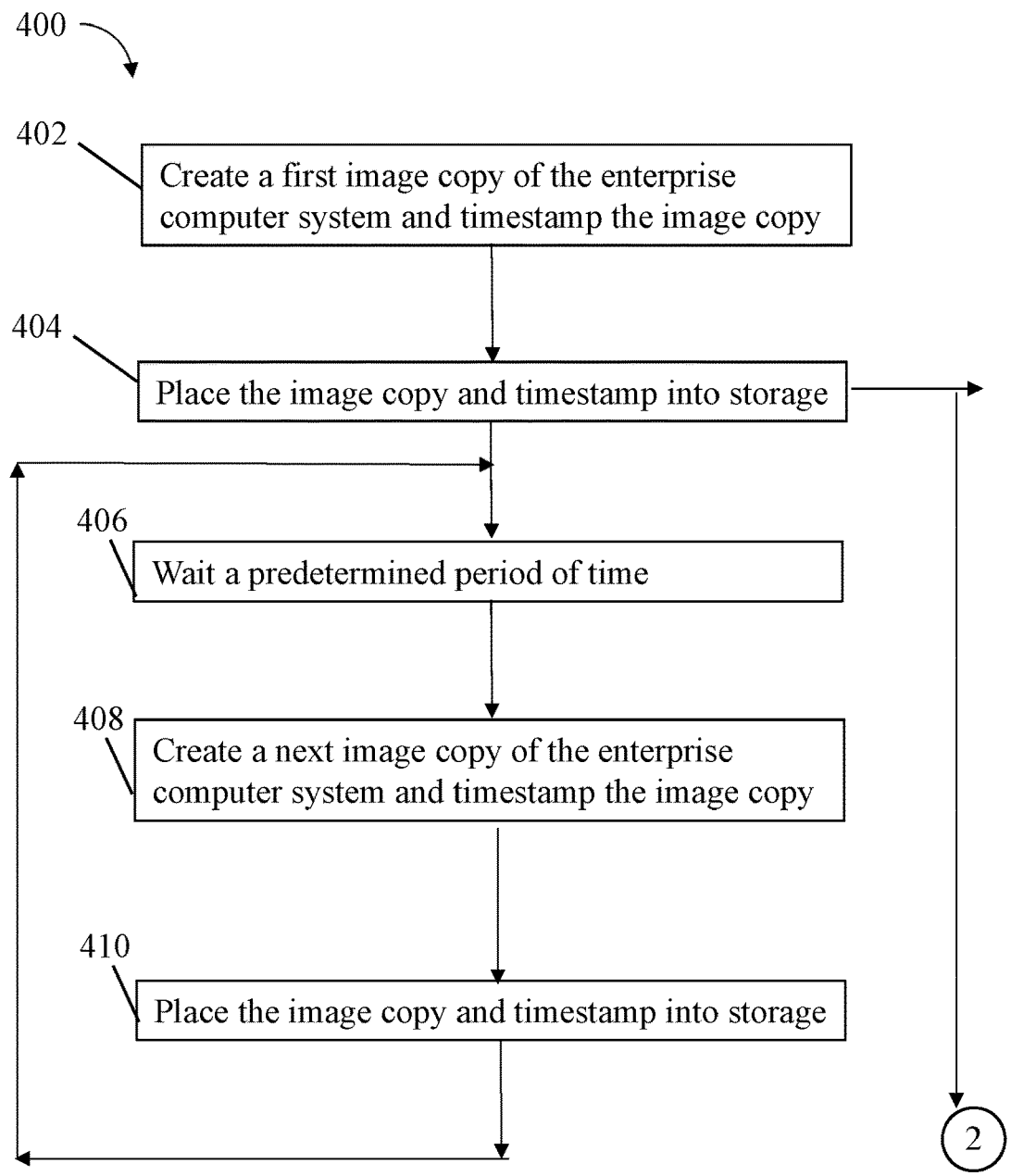
FIG. 4 is a flow chart illustrating a process for creating enterprise-level image copies, in accordance with some embodiments of the present disclosure.

Referring to FIG. 4, a flow chart is provided illustrating a process 400 for creating enterprise-level image copies 114. Referring to FIGS. 2 and 4, a first image copy 250 of the enterprise computer system 100 is created by the copy manager 140 and the image copy 250 is timestamped by the recovery manager 150. The image copy 250 and its associated timestamp are placed 404 into storage by the recovery manager 150 as shown in FIG. 1. A predetermined period of time elapses 406 and a next image copy 252 is created 408 by the copy manager 130. The period of time that elapses 406 between image copy generation is, in one embodiment, every 15 minutes. In at least one embodiment, the waiting period is one day. In other embodiments, the waiting period is any value that enables operation of the enterprise computer system 100 as described herein. In addition, the waiting period need not be consistent time periods, rather in at least one embodiment, the image copies are generated as a function of other parameters and criteria, e.g., changes to the enterprise computer system 100 that are defined by predetermined parameters. The next image copy 252 and its associated timestamp are placed 410 into storage by the recovery manager 150 as shown in FIG. 1. The portion of the process 400 that includes the operations 406 through 410 are iteratively repeated whenever the criteria for generating an image copy of the enterprise computer system 100 is desired or necessitated. Accordingly, image copies of the enterprise computer system 100 are generated and the image copies are timestamped and stored for use as described further herein.

Figure 5:
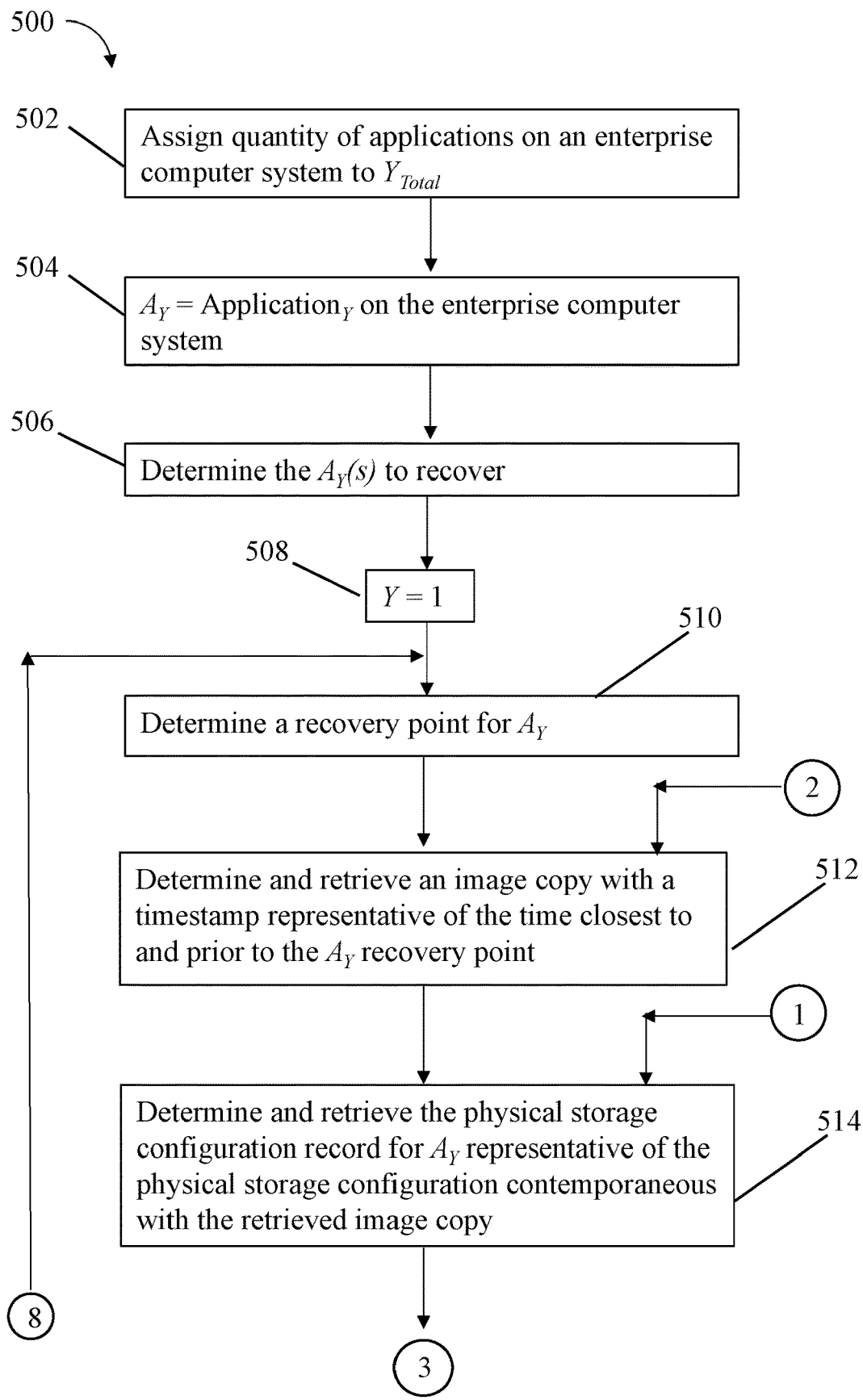
FIG. 5 is a flow chart illustrating a process for recovering applications at a particular recovery point from an enterprise-level image copy and physical storage configuration records, in accordance with some embodiments of the present disclosure.
Figure 5:
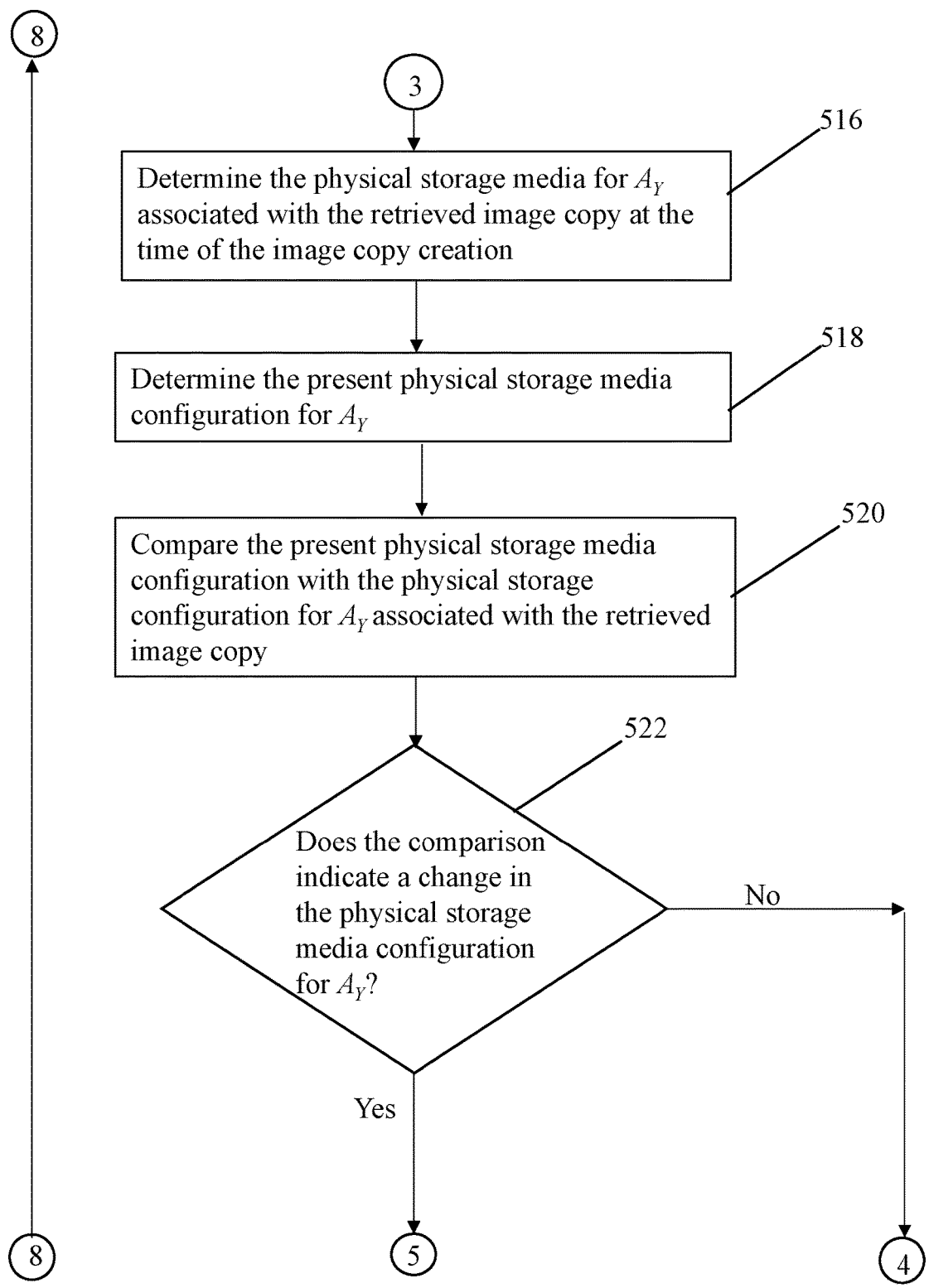
Figure 5:
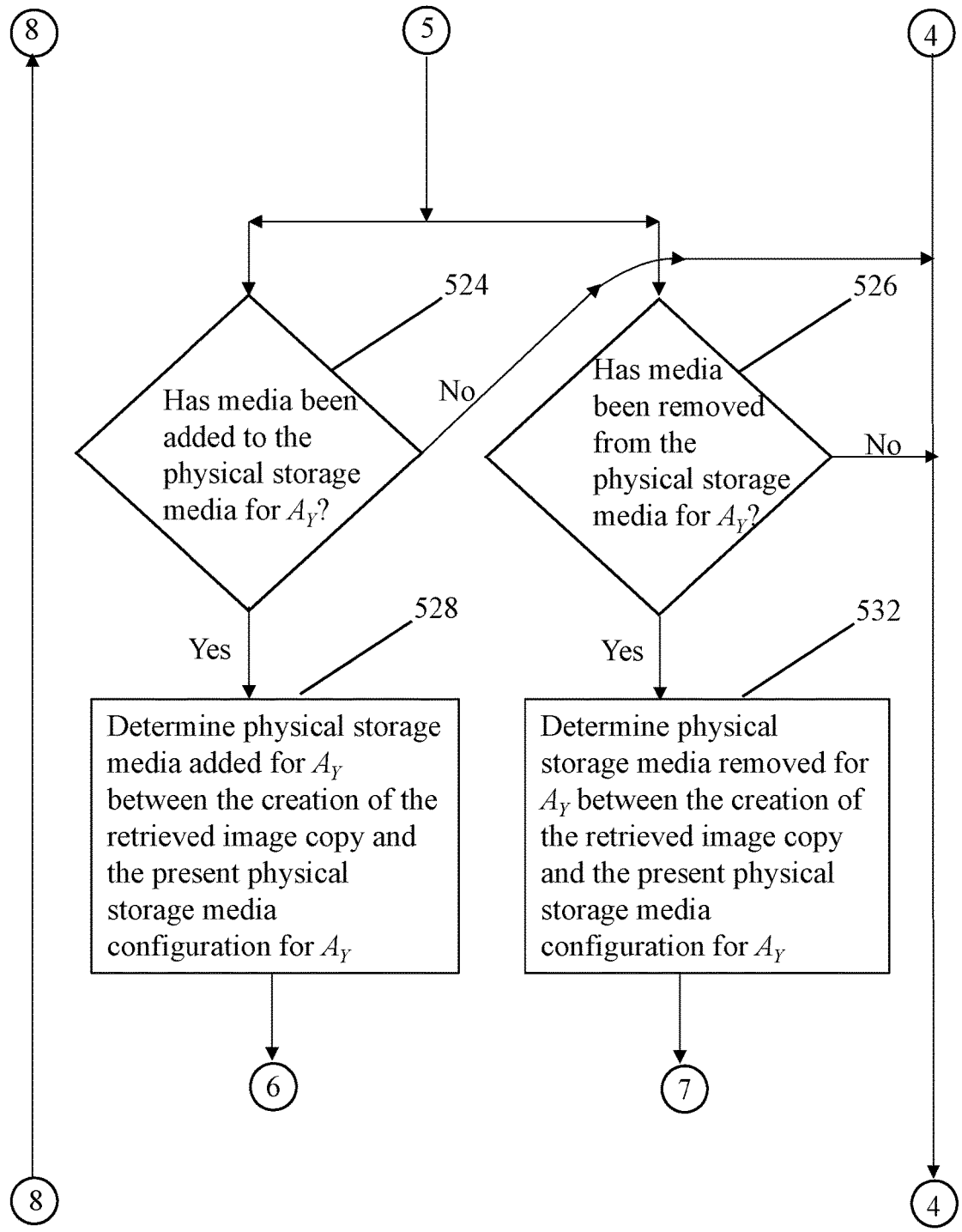
Figure 5:
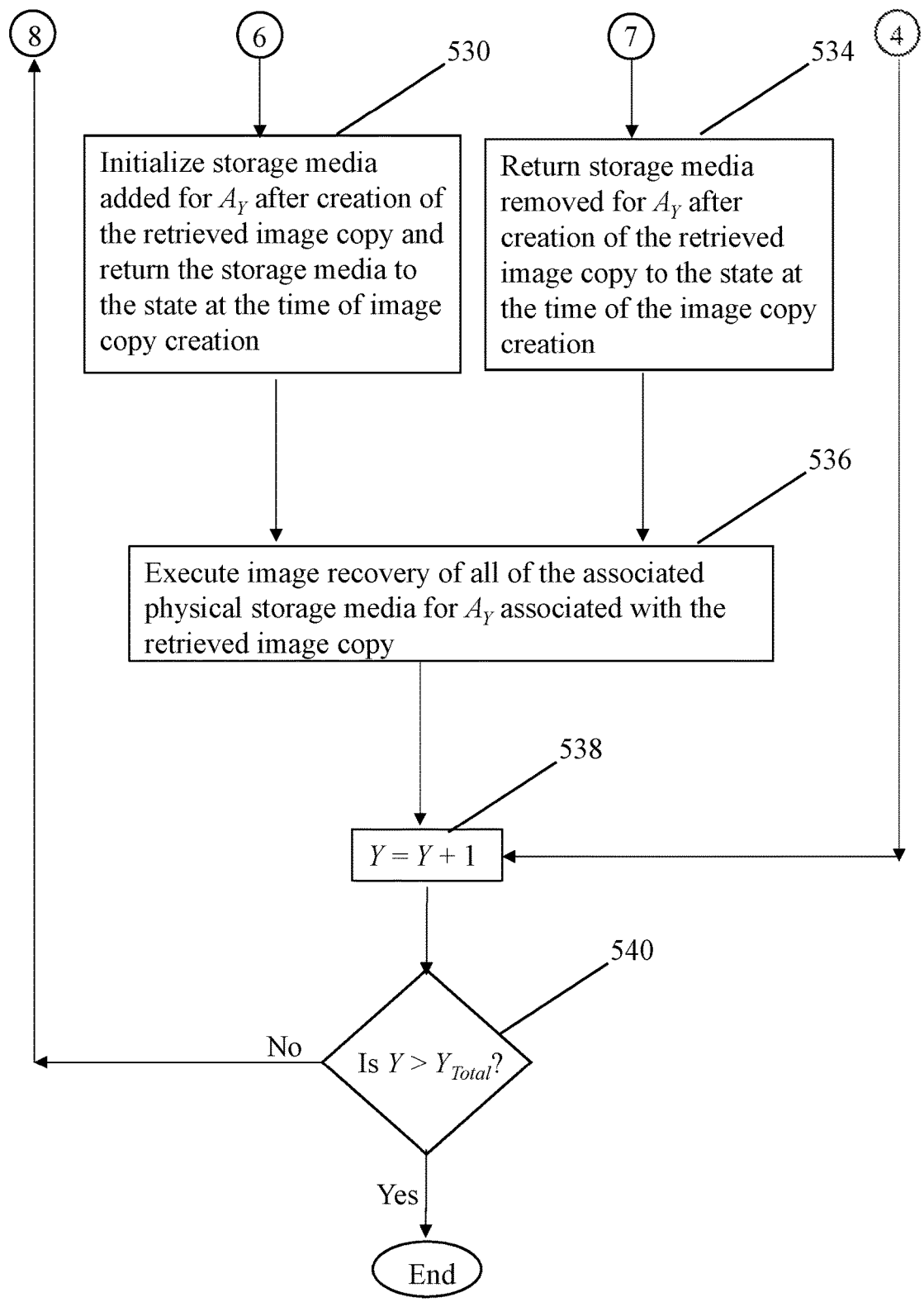

Referring to FIG. 5, a flow chart is provided illustrating a process 500 for recovering selected applications at a particular recovery point from an enterprise-level image copy and physical storage configuration records. Referring to FIGS. 2 and 5, the variable $Y_{Total}$ is assigned 502 to represent a quantity of applications $A_Y$ on the enterprise computer system 100. The variable $A_Y$ is individually assigned 504 to each of the $Y_{Total}$ applications to be recovered as described herein. The identities of the applications $A_Y$ to be recovered are determined 506. In at least one embodiment, a user makes the determination 506 of the applications $A_Y$ to be recovered based on factors that include, without limitation, an unplanned failure of the application(s) due to a hardware failure, and a malicious corruption of the associated data. In at least one embodiment, an artificial intelligence (AI) system coupled to the enterprise computer system 100 may determine a need to recover one or more applications based on predetermined criteria for recoveries, thereby automating the determine operation 506. A corresponding application (A) variable, Y, is initialized 508. Accordingly, the applications to be recovered on the enterprise computer system 100 are determined.

In at least one embodiment, a user determines 506 that application $A_1$ is the first application to be recovered. In at least one other embodiment, any of the applications from $A_1$ to $A_Y$ may be recovered first. In at least one embodiment, a user determines 510 a recovery point 260 for the application $A_1$ at a time $T_R$. In one embodiment, all of the applications to be recovered have the same recovery point 260. In at least one other embodiment, each application to be recovered has a different recovery point 260. In at least one embodiment, the recovery point 260 is established through a process including, without limitation, an AI. Using the established recovery point 260 as an anchor for the recovery of the application $A_1$, an image copy 262 of the enterprise computer system 100 that was created with a timestamp $T_{1C}$ representative of the time closest to and prior to the $A_1$ recovery point 260 is determined and retrieved 512 by the recovery manager 150 from the image copies 114 resident on the determined storage device 112. The physical storage configuration record 264 for the recovery of the application $A_1$ created at time $T_{A1}$ and representative of the physical storage configuration associated with the retrieved image copy 262 is determined and retrieved 514 by the recovery manager 150 from the physical storage configuration records 116 resident on the determined storage device 112. The physical storage configuration record 264 is contemporaneous with the retrieved image copy 262, i.e., the most recent physical storage configuration record 264 is created prior to the creation of the retrieved image copy 262 at time $T_{1C}$ by the recovery manager 150. Furthermore, from the physical storage configuration record 264, the recovery manager 150 determines 516 the detailed physical storage media contemporaneous with the application $A_1$ at the time $T_{1C}$ of the retrieved image copy 262 creation. Accordingly, the recovery point 260 of the application $A_1$ to be recovered determines the retrieved image copy 262 of the enterprise computer system 100 and the physical storage configuration record 264 that will be used to perform the recovery of application $A_1$.

The recovery manager 150 determines 518 the present physical storage media configuration of the storage devices 112 of the application $A_1$ at time $T=T_P$. Specifically, the recovery manager 150 queries the configuration manager 130 for the information associated with the most recent change to the configuration of the storage system 108 that is resident within the application directory. The recovery manager 150 creates a present physical storage media configuration record 266 that is stored by the recovery manager 150. The recovery manager 150 compares 520 the present physical storage media configuration record 266 with the physical storage configuration record 264 for the application $A_1$ that is associated with the retrieved image copy 262 and is the physical storage media configuration record 266 most recently created prior to the creation of the retrieved image copy 262 at the time $T_{1C}$. A determination 522 is made by the recovery manager 150 if the comparison 520 indicates a change in the physical storage media configuration for the application $A_1$ between the times $T_{A1}$ and $T_P$. A negative response to the determination operation 522 results in the process 500 moving to an incrementing operation for the counting variable Y as described further herein. Accordingly, a comparison is performed to determine the changes to the physical storage configuration for the application between the present configuration and the configuration determined to be defined at the creation of the retrieved image copy.

A positive response to the determination operation 522 results in the performance of two further determination operations. The first determination operation is a determination 524, made by the recovery manager 150, if any additional media has been added to the physical storage media for the application $A_1$ since the physical storage configuration record 264 associated with the retrieved image copy 262 was created. The second determination operation is a determination 526, made by the recovery manager 150, if any media has been removed from the physical storage media for the application $A_1$ since the physical storage configuration record 264 associated with the retrieved image copy 262 was created. A negative response to either determination operations 524 or 526 results in the process 500 moving to the incrementing operation for the counting variable Y as described further herein. A positive response to the first determination operation 524 results in determining 528, by the recovery manager 150, the physical storage media added for the application $A_1$ between the time $T_{1C}$ when the retrieved image copy 262 is created and the time $T_P$ when the present physical storage media configuration record 266 for $A_1$ is created. Notably, in at least one embodiment for the application $A_1$, the physical storage media configuration at the recovery point 260, the retrieved image copy 262, and the time $T_{A1}$ is the same. Alternative embodiments are discussed further herein. With the present storage media configuration and the storage media configuration at the time $T_{1C}$ when the retrieved image copy 262 is created both known, the storage media configuration for the storage devices 112 added for the application $A_1$ is initialized 530, by the configuration manager 130 as prompted by the recovery manager 150, for the storage media configuration for the storage devices 112 to reflect the status of such added storage media at the time $T_{1C}$ of the retrieved image copy 262 creation.

A positive response to the second determination operation 526 results in determining 532, by the recovery manager 150, the physical storage media removed from the application $A_1$ between the time $T_{1C}$ when the retrieved image copy 262 is created and the time $T_P$ when the present physical storage media configuration record 266 for the application $A_1$ is created. Notably, in at least one embodiment for the application $A_1$, the physical storage media configuration at the recovery point 260, the retrieved image copy 262, and the time $T_{A1}$ is the same. Alternative embodiments are discussed further herein. With the present storage media configuration and the storage media configuration at the time $T_{1C}$ when the retrieved image copy 262 is created both known, the storage media configuration for the storage devices 112 removed from the application $A_1$ is returned 534, by the configuration manager 130 as prompted by the recovery manager 150, to the storage media configuration for the storage devices 112 to reflect the status of such removed storage media at the time $T_{1C}$ of the retrieved image copy 262 creation.

The initializing 530 of the storage devices 112 added and the returning 534 of the storage devices 112 removed completes restoring the storage devices 112 to a state consistent with the physical storage configuration record 264. Accordingly, the changes to the storage media configuration for the storage devices 112 with respect to the application $A_1$ are determined and the recovery manager 150 executes 536 an image recovery of all of the associated physical storage devices 112 to reflect the configuration of the storage devices 112 at the time $T_{1C}$.

After the image recovery for the application $A_1$ at the execute operation 536, the application counting variable Y is incremented 538. It is then determined 540 if all of the applications $A_Y$ selected for recovery have been subject to the recovery process 500. A negative response to the determination operation 540 returns the process 500 to the determination operation 510 and a positive response to the determination operation 540 concludes the process 500 of application recovery.

In at least one embodiment, for example, application $A_2$, as shown in FIG. 2 associated with the timeline 210, the recovery point 260 that was used for the application $A_1$ is also used to recover the application $A_2$. In at least one embodiment, a different recovery point for the recovery of the application $A_2$ is used. As such, the same image copy 262 is retrieved. The physical storage configuration record 232 for the recovery of the application $A_2$ created at time $T_{A1}$ by the recovery manager 150 and representative of the physical storage configuration associated with the retrieved image copy 262 is retrieved 514 by the recovery manager 150 from the physical storage configuration records 116 resident on the determined storage device 112. The physical storage configuration record 232 is the most recent created prior to the creation of the retrieved image copy 262 at time $T_{1C}$ by the recovery manager 150. From the physical storage configuration record 232, the recovery manager 150 determines 516 the detailed physical storage media associated with the application $A_2$ at the time $T_{1C}$ of the retrieved image copy 262 creation. Accordingly, the recovery point 260 of the application $A_2$ to be recovered determines the retrieved image copy 262 of the enterprise computer system 100 and the physical storage configuration record 232 that will be used to perform the recovery of application $A_2$.

The configuration manager 130 determines 518 the present physical storage media configuration of the storage devices 112 of the application $A_2$ at time $T=T_P$ and the recovery manager 150 creates and stores a present physical storage media configuration record 268. The recovery manager 150 compares 520 the present physical storage media configuration record 268 with the physical storage configuration record 232 for the application $A_2$ that is associated with the retrieved image copy 262 and is the physical storage configuration record 232 most recently created prior to the creation of the retrieved image copy 262 at the time $T_{1C}$. A determination 522 is made by the recovery manager 150 if the comparison 520 indicates a change in the physical storage media configuration for the application $A_1$ between the times $T_{A2}$ and $T_P$. A negative response to the determination operation 522 results in the process 500 moving to the incrementing operation 538 for the counting variable Y. Accordingly, a comparison is performed to determine the changes to the physical storage configuration for the application between the present configuration and the configuration determined to be defined at the creation of the retrieved image copy.

A positive response to the determination operation 522 results in the performance of two further determination operations by the recovery manager 150. The first determination operation is a determination 524 if any additional media has been added to the physical storage media for the application $A_2$ since the physical storage configuration record 232 associated with the retrieved image copy 262 was created. The second determination operation is a determination 526 if any media has been removed from the physical storage media for the application $A_2$ since the physical storage configuration record 232 associated with the retrieved image copy 262 was created. A negative response to either determination operations 524 or 526 results in the process 500 moving to the incrementing operation 538 for the counting variable Y. A positive response to the first determination operation 524 results in determining 528 the physical storage media added for the application $A_2$ between the time $T_{1C}$ when the retrieved image copy 262 is created and the time $T_P$ when the present physical storage media configuration record 268 for $A_2$ is created. Notably, in at least one embodiment for the application $A_2$, the physical storage media configuration at the recovery point 260, the retrieved image copy 262, and the time $T_{A2}$ are different, in contrast to the embodiment described for the application $A_1$ as described herein. Specifically, a storage media configuration record 270 is recorded on the timeline 210 between the recovery point 260 and the time $T_{1C}$ of the creation of the retrieved image copy 262. This change to the storage media configuration of the application $A_2$ is accounted for in the following operations since the selected storage media configuration record 232 is created and stored at time $T_{A2}$, which is the record prior to the retrieved image copy 262 creation time $T_{1C}$. With the present storage media configuration and the storage media configuration at the time $T_{1C}$ when the retrieved image copy 262 is created both known, the storage media configuration for the storage devices 112 added or removed for the application $A_2$ is initialized 530 or returned 534 for the storage media configuration for the storage devices 112 to reflect the status of such added or removed, respectively, storage media at the time $T_{1C}$ of the retrieved image copy 262 creation. The remainder for the process 500 for the application $A_2$ is performed in a manner similar to that for the application $A_1$ as described herein.

In at least one embodiment, for example, application $A_Y$, as shown in FIG. 2 associated with the timeline 212, the recovery point 260 that was used for the applications $A_1$ and $A_2$ is also used to recover the application $A_Y$. In at least one embodiment, a different recovery point for the recovery of the application $A_Y$ is used. As such. the same image copy 262 is retrieved. The physical storage configuration record 234 for the recovery of the application $A_Y$ created at time $T_{AY}$ and representative of the physical storage configuration associated with the retrieved image copy 262 is retrieved 514 by the recovery manager 150 from the physical storage configuration records 116 resident on the determined storage device 112. The physical storage configuration record 234 is the most recent created prior to the creation of the retrieved image copy 262 at time $T_{1C}$ by the recovery manager 150. From the physical storage configuration record 234, the recovery manager 150 determines 516 the detailed physical storage media associated with the application $A_Y$ at the time $T_{1C}$ of the retrieved image copy 262 creation. Accordingly, the recovery point 260 of the application $A_Y$ to be recovered determines the retrieved image copy 262 of the enterprise computer system 100 and the physical storage configuration record 234 that will be used to perform the recovery of application $A_2$.

The configuration manager 134 determines 518 the present physical storage media configuration of the storage devices 112 of the application $A_Y$ at time $T=T_P$ and the recovery manager 150 creates and stores a present physical storage media configuration record 268. The recovery manager 150 compares 520 the present physical storage media configuration record 272 with the physical storage configuration record 234 for the application $A_Y$ that is associated with the retrieved image copy 262 and is the physical storage media configuration record 234 most recently created prior to the creation of the retrieved image copy 262 at the time $T_{1C}$. A determination 522 is made by the recovery manager 150 if the comparison 520 indicates a change in the physical storage media configuration for the application $A_Y$ between the times $T_{AY}$ and $T_P$. A negative response to the determination operation 522 results in the process 500 moving to the incrementing operation 538 for the counting variable Y and since there have been no changes, the process 500 skips to the image recovery operation 536. Accordingly, the process 500 also effectively recovers applications that have no changes to the associated storage devices 122.

Accordingly, the execution of application-level recoveries from an enterprise-level image copy results in a practical application of an improvement to the functioning of the associated computer systems, and specifically, through dynamically capturing environmental configuration changes related to applications such that application-level recoveries may be performed from enterprise-level image copy backups.

Figure 6:
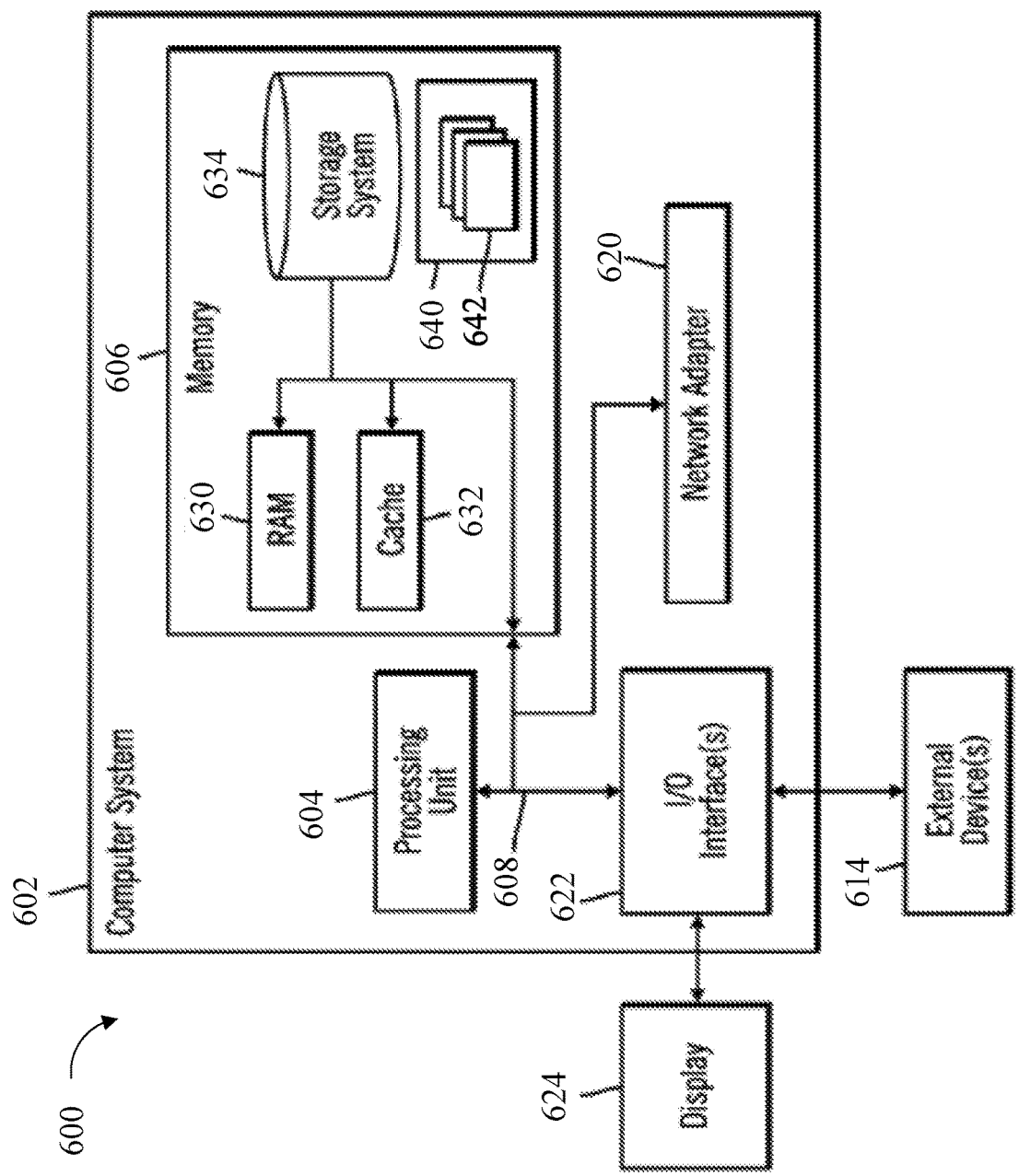
FIG. 6 is a block diagram illustrating a computer system/server of a cloud-based support system, to implement the processes described above with respect to FIGS. 1-5, in accordance with some embodiments of the present disclosure.

Aspects of the recovery manager 150 may be embodied in a computer system/server in a single location, or in at least one embodiment, may be configured in a cloud-based system sharing computing resources. With reference to FIG. 6, a block diagram is provided illustrating an example of a computer system 600 including a computer/server 602, hereinafter referred to as a host 602 in communication with a cloud based support system, to implement the system, tools, and processes described above with respect to FIGS. 1-5. Host 602 is operational with numerous other general purpose or special purpose computer system environments or configurations. Examples of well-known computer systems, environments, and/or configurations that may be suitable for use with host 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host 602 may be described in the general context of computer system-executable instructions, such as program modules, being executed by a computer system. Generally, program modules may include routines, programs, objects, components, logic, data structures, and so on that perform particular tasks or implement particular abstract data types. Host 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, host 602 is shown in the form of a general-purpose computing device. The components of host 602 may include, but are not limited to, one or more processors or processing devices or units 604, e.g. hardware processors, a system memory 606, and a bus 608 that couples various system components including system memory 606 to processing device 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 602 typically includes a variety of computer system readable media. Such media may be any available media that is accessible by host 602 and it includes both volatile and non-volatile media, removable and non-removable media.

Memory 606 can include computer system readable media in the form of volatile memory, such as random access memory (RAM) 630 and/or cache memory 632. By way of example only, a storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces.

Program/utility 640, having a set (at least one) of program modules 642, may be stored in memory 606 by way of example, and not limitation, as well as an operating system, one or more application programs, other program modules, and program data. Each of the operating systems, one or more application programs, other program modules, and program data or some combination thereof, may include an implementation of a networking environment. Program modules 642 generally carry out the functions and/or methodologies of embodiments to dynamically capture environmental configuration changes related to applications such that application-level recoveries may be performed from enterprise-level image copy backups. For example, the set of program modules 642 may include the recovery manager 150, the copy manager 140, and the configuration manager 130 as described in FIGS. 1-5.

Host 602 may also communicate with one or more external devices 614, such as a keyboard, a pointing device, etc.; a display 624; one or more devices that enable a user to interact with host 602; and/or any devices (e.g., network card, modem, etc.) that enable host 602 to communicate with one or more other computing devices. Such communication can occur via Input/Output (I/O) interface(s) 622. Still yet, host 602 can communicate with one or more networks such as a local area network (LAN), a general wide area network (WAN), and/or a public network (e.g., the Internet) via network adapter 620. As depicted, network adapter 620 communicates with the other components of host 602 via bus 608. In at least one embodiment, a plurality of nodes of a distributed file system (not shown) is in communication with the host 602 via the I/O interface 622 or via the network adapter 620. It should be understood that although not shown, other hardware and/or software components could be used in conjunction with host 602. Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory 606, including RAM 630, cache memory 632, and storage system 634, such as a removable storage drive and a hard disk installed in a hard disk drive.

Computer programs (also called computer control logic) are stored in memory 606. Computer programs may also be received via a communication interface, such as network adapter 620. Such computer programs, when run, enable the computer system to perform the features of the present embodiments as discussed herein. In particular, the computer programs, when run, enable the processing device 604 to perform the features of the computer system. As such, computer programs may represent controllers of the computer system. Accordingly, the functionality for the recovery manager 150, including the copy manager 140 and the configuration manager 130, as described in FIGS. 1-5, is embodied as computer program code stored in memory 606 (in some embodiments as program modules 642), where the computer program code includes the instructions to be executed by the processing device 604 to provide the functionality of the recovery manager 150 as described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments. Accordingly, the functionality for the recovery manager 150, including the copy manager 140 and the configuration manager 130, as described in FIGS. 1-5, may be embodied as computer readable program instructions to be executed by one or more hardware devices other than, or in addition to, the processing device 604 to provide the functionality of the recovery manager 150 as described herein.

In at least one embodiment, host 602 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
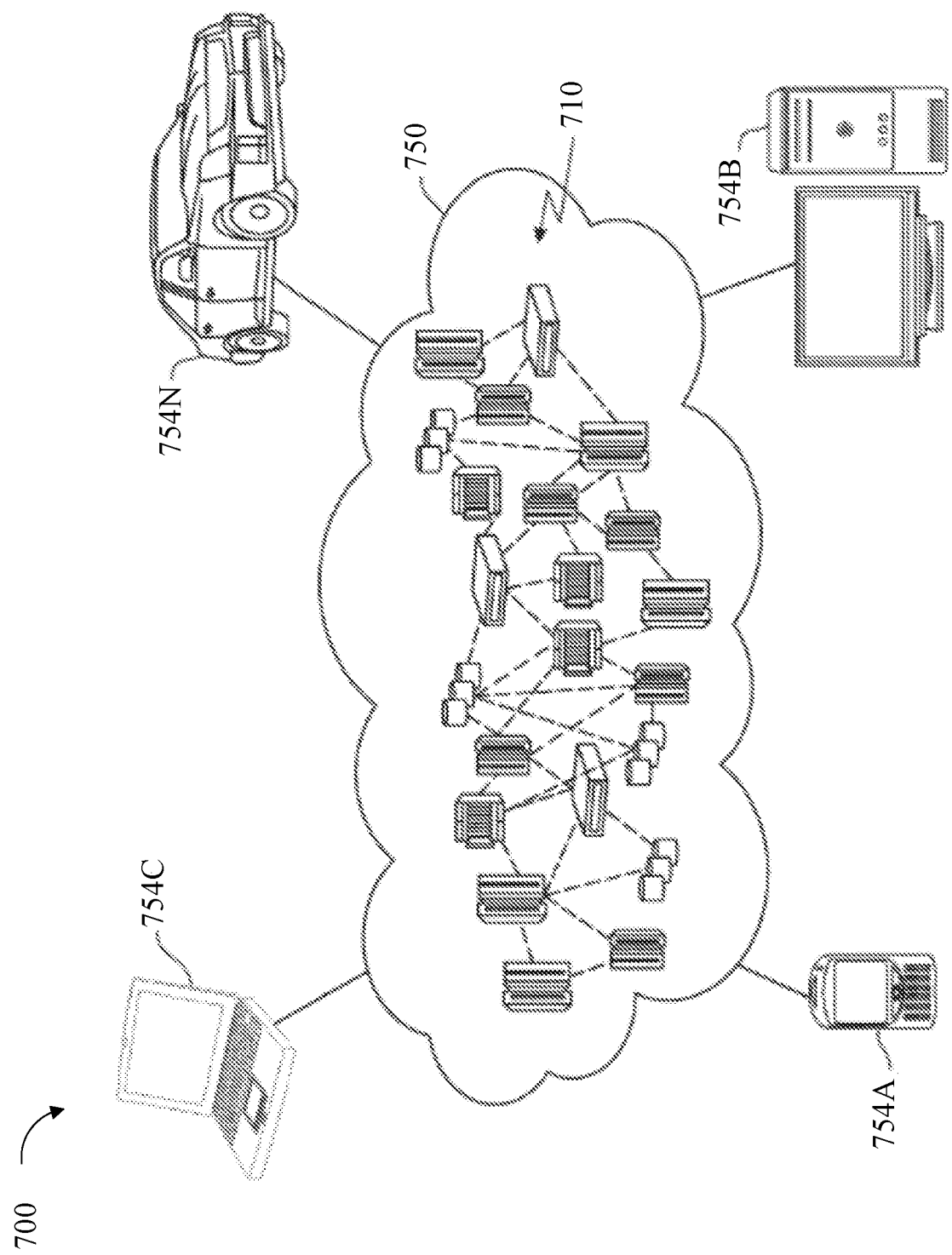
FIG. 7 is a schematic diagram illustrating a cloud computer environment, in accordance with some embodiments of the present disclosure.

Referring now to FIG. 7, a schematic diagram is provided illustrating an example cloud computing network 700. As shown, cloud computing network 700 includes a cloud computing environment 750 having one or more cloud computing nodes 710 with which local computing devices used by cloud consumers may communicate. Examples of these local computing devices include, but are not limited to, personal digital assistant (PDA) or cellular telephone 754A, desktop computer 754B, laptop computer 754C, and/or automobile computer system 754N. Individual nodes within nodes 710 may further communicate with one another. They may be grouped (not shown) physically or virtually, in one or more networks, such as Private, Community, Public, or Hybrid clouds as described hereinabove, or a combination thereof. This allows the cloud computing network 700 to offer infrastructure, platforms and/or software as services for which a cloud consumer does not need to maintain resources on a local computing device. It is understood that the types of computing devices 754A-N shown in FIG. 7 are intended to be illustrative only and that the cloud computing environment 750 can communicate with any type of computerized device over any type of network and/or network addressable connection (e.g., using a web browser).

Figure 8:
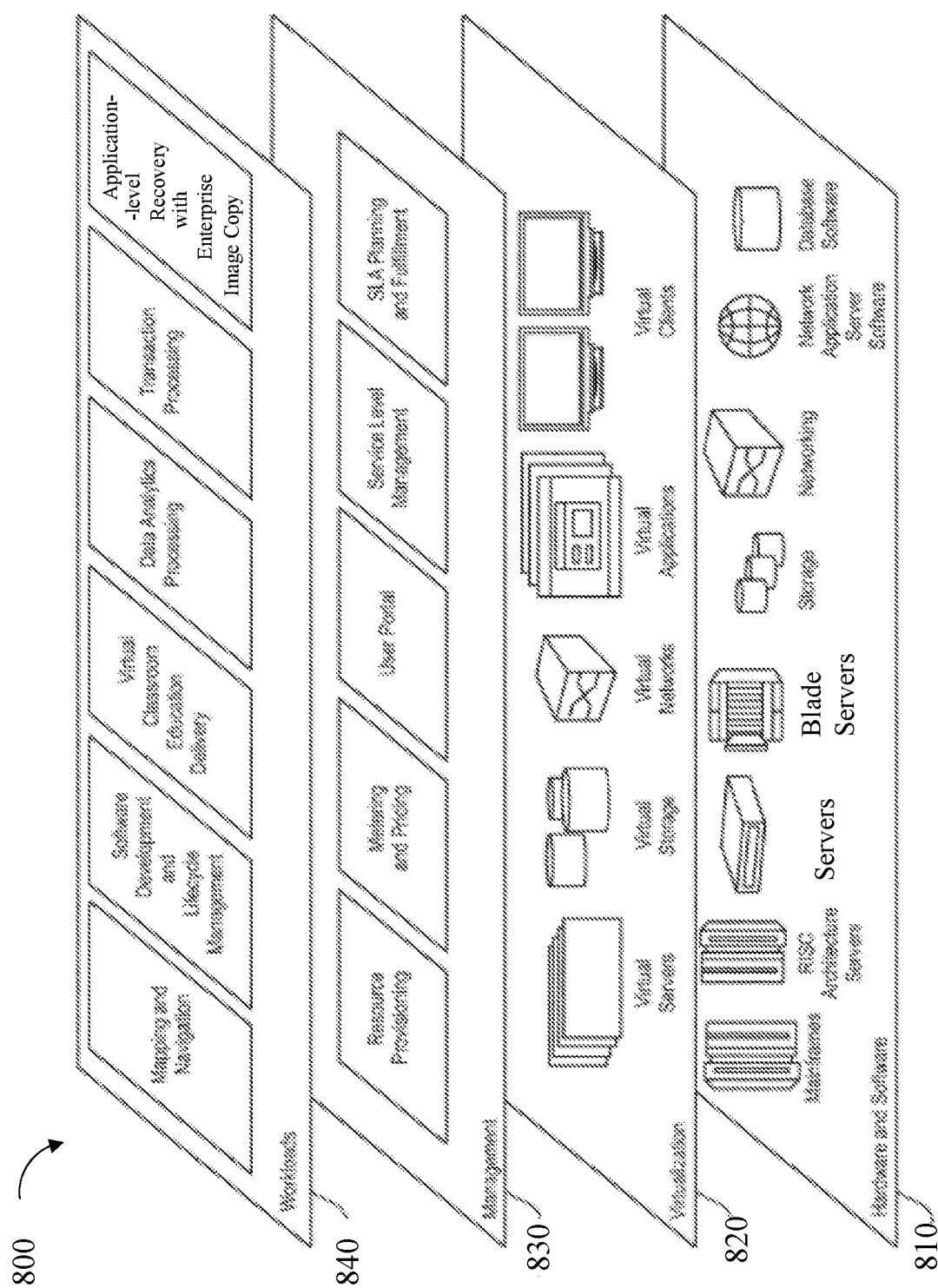
FIG. 8 is a block diagram illustrating a set of functional abstraction model layers provided by the cloud computing environment, in accordance with some embodiments of the present disclosure.

Referring now to FIG. 8, a set of functional abstraction layers 800 provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer 810, virtualization layer 820, management layer 830, and workload layer 840.

The hardware and software layer 810 include hardware and software components. Examples of hardware components include mainframes; RISC (Reduced Instruction Set Computer) architecture-based servers; servers; blade servers; storage devices; networks and networking components. Examples of software components include network application server software, and database software.

Virtualization layer 820 provides an abstraction layer from which the following examples of virtual entities may be provided: virtual servers; virtual storage; virtual networks, including virtual private networks; virtual applications and operating systems; and virtual clients.

In one example, management layer 830 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer 840 provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and application-level recoveries performed with enterprise-level image copies.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present disclosure have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of a computer-based system or platform.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

What is claimed is:

1. A computer system comprising: a processing device; a plurality of storage devices communicatively coupled with the processing device; and a recovery manager communicatively coupled with the processing device, the recovery manager configured to: create a first storage configuration record of the computer system; a copy manager communicatively coupled with the recovery manager, the copy manager configured to: create an image copy of the computer system, wherein the image copy of the computer system and the first storage configuration record are independent of each other; and the recovery manager further configured to: recover a portion of the computer system subject to the first storage configuration record, the image copy of the computer system, and a determined recovery point for the portion of the computer system, wherein the portion of the computer system comprises two or more storage devices of the plurality of storage devices and is associated with one application exclusively, wherein the first storage configuration record defines an association between the application and the two or more storage devices of the plurality of storage devices, and wherein the association defines a first physical storage devices configuration.

2. The system of claim 1 further comprising:
a plurality of applications resident thereon, each application of the plurality of applications residing on a respective portion of the plurality of storage devices dedicated exclusively to that application, the recovery manager further configured to:
record the respective portion of the plurality of storage devices dedicated to each application of the plurality of applications to generate the first storage configuration record; and
record a first temporal value for the first storage configuration record for each application of the plurality of applications.

3. The system of claim 2, the recovery manager further configured to:
record a second temporal value associated with the image copy of the computer system.

4. The system of claim 3, the recovery manager further configured to perform a recovery of one or more applications of the plurality of applications, wherein:
the recovery manager further configured to:
identify a third temporal value associated with the recovery point;
determine the first and second temporal values are prior to the third temporal value;
create a second storage configuration record representative of a second physical storage devices configuration with a fourth temporal value, wherein the fourth temporal value is subsequent to the third temporal value, and the second storage configuration record is different from the first storage configuration record;

create a comparison of the first and second storage configuration records;

determine a physical storage devices configuration difference subject to the comparison; and change the second physical storage devices configuration to the first physical storage devices configuration based on the configuration difference.

5. The system of claim 4, the recovery manager further configured to:

determine first physical storage media added to the first physical storage devices configuration at one or more temporal values between the first temporal value and the fourth temporal value; and determine second physical storage media removed from the first physical storage devices configuration at one or more temporal values between the first temporal value and the fourth temporal value.

6. The system of claim 5, wherein:

the recovery manager further configured to:
initialize the first physical storage media; and
return the second physical storage media; and the copy manager further configured to:
restore the first and second physical storage media to a state consistent with the first storage configuration record.

7. A computer program product for enterprise computer system recovery, the computer program product comprising: one or more computer readable storage media; and program instructions collectively stored on the one or more computer-readable storage media, the program instructions comprising: program instructions to create a first storage configuration record of an enterprise computer system; program instructions to create an image copy of the enterprise computer system, wherein the image copy of the enterprise computer system and the first storage configuration record are independent of each other; program instructions to determine a recovery point for a portion of the enterprise computer system, wherein the portion of the computer system is associated with one application exclusively; and program instructions to recover the portion of the enterprise computer system subject to the first storage configuration record, the image copy of the enterprise computer system, and the determined recovery point for the portion of the enterprise computer system, wherein the portion of the enterprise computer system comprises two or more storage devices of a plurality of storage devices, the first storage configuration record defines an association between the application and the two or more storage devices of the plurality of storage devices, and wherein the association defines a first physical storage devices configuration.

8. The computer program product of claim 7, wherein the enterprise computer system includes a plurality of applications resident thereon, each application of the plurality of applications residing on a respective portion of the plurality of storage devices dedicated exclusively to that application, wherein creating a first storage configuration record of the enterprise computer system further comprises program instructions to:

record the respective portion of the plurality of storage devices dedicated to each application of the plurality of applications to generate the first storage configuration record; and record a first temporal value for the first storage configuration record for each application of the plurality of applications.

9. The computer program product of claim 8, wherein creating the image copy of the enterprise computer system further comprises program instructions to:

record a second temporal value associated with the image copy of the enterprise computer system.

10. The computer program product of claim 9, wherein recovering the portion of the enterprise computer system further comprises program instructions to:

perform a recovery of one or more applications of the plurality of applications further comprising program instructions to:

identify a third temporal value associated with the recovery point;

determine the first and second temporal values are prior to the third temporal value;

create a second physical storage configuration record representative of a second physical storage devices configuration with a fourth temporal value, wherein the fourth temporal value is subsequent to the third temporal value, and the second storage configuration record is different from the first storage configuration record;

create a comparison of the first and second storage configuration records;

determine a physical storage devices configuration difference subject to the comparison; and change the second physical storage devices configuration to the first physical storage devices configuration based on the configuration difference.

11. The computer program product of claim 10, further comprising program instructions to:

create a plurality of storage configuration records, wherein each storage configuration record is associated with a unique first temporal value; and create a plurality of image copies of the enterprise computer system, wherein each image copy of the enterprise computer system is associated with a unique second temporal value.

12. A computer-implemented method comprising: creating a first storage configuration record of an enterprise computer system; creating an image copy of the enterprise computer system, wherein the image copy of the enterprise computer system and the first storage configuration record are independent of each other; determining a recovery point for a portion of the enterprise computer system, wherein the portion of the computer system is associated with one application exclusively; and recovering a portion of the enterprise computer system subject to the first storage configuration record, the image copy of the enterprise computer system, and the determined recovery point for the portion of the computer system, wherein the portion of the enterprise computer system comprises two or more storage devices of the plurality of storage devices, the first storage configuration record defines an association between the application and the two or more storage devices of the plurality of storage devices, and wherein the association defines a first physical storage devices configuration.

13. The method of claim 12, wherein the enterprise computer system includes a plurality of applications resident thereon, each application of the plurality of applications residing on a respective portion of the plurality of storage devices dedicated exclusively to that application, wherein creating a first storage configuration record of the enterprise computer system comprises:

recording the respective portion of the plurality of storage devices dedicated to each application of the plurality of applications to generate the first storage configuration record; and recording a first temporal value for the first storage configuration record for each application of the plurality of applications.

14. The method of claim 13, wherein creating the image copy of the enterprise computer system comprises:

recording a second temporal value associated with the image copy of the enterprise computer system.

15. The method of claim 14, wherein recovering the portion of the enterprise computer system comprises:

performing a recovery of one or more applications of the plurality of applications comprising:

identifying a third temporal value associated with the recovery point;

determining the first and second temporal values are prior to the third temporal value;

creating a second storage configuration record representative of a second physical storage devices configuration with a fourth temporal value, wherein the fourth temporal value is subsequent to the third temporal value, and the second storage configuration record is different from the first storage configuration record;

creating a comparison of the first and second storage configuration records;

determining a physical storage devices configuration difference subject to the comparison; and changing the second physical storage devices configuration to the first physical storage devices configuration based on the configuration difference.

16. The method of claim 15, further comprising:

creating a plurality of storage configuration records, wherein each storage configuration record is associated with a unique first temporal value; and creating a plurality of image copies of the enterprise computer system, wherein each image copy of the enterprise computer system is associated with a unique second temporal value.

17. The method of claim 16, wherein determining the second temporal value is prior to the third temporal value comprises:

retrieving an image copy of the enterprise computer system with a temporal value representative of a temporal value closest to and prior to the third temporal value.

18. The method of claim 17, further comprising:

retrieving a storage configuration record with a unique first temporal value contemporaneous with the unique second temporal value associated with the retrieved image copy of the enterprise computer system.

19. The method of claim 15, wherein determining a physical storage configuration difference comprises:

determining first storage media added to the first physical storage devices configuration at one or more temporal values between the first temporal value and the fourth temporal value; and determining second physical storage media removed from the first physical storage devices configuration at one or more temporal values between the first temporal value and the fourth temporal value.

20. The method of claim 19, wherein changing the second physical storage devices configuration to the first physical storage devices configuration based on the configuration difference comprises:

initializing the first physical storage media;

returning the second physical storage media; and restoring the first and second physical storage media to a state consistent with the first physical storage configuration record.

* * * * *